US011126623B1

(12) United States Patent
Plenderleith

(10) Patent No.: US 11,126,623 B1
(45) Date of Patent: Sep. 21, 2021

(54) INDEX-BASED REPLICA SCALE-OUT

(71) Applicant: Amazon Technologies, Inc., Seattle, WA (US)

(72) Inventor: Jamie Plenderleith, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 872 days.

(21) Appl. No.: 15/278,807

(22) Filed: Sep. 28, 2016

(51) Int. Cl.
*G06F 16/2453* (2019.01)
*G06F 16/22* (2019.01)

(52) U.S. Cl.
CPC ........ *G06F 16/24542* (2019.01); *G06F 16/22* (2019.01)

(58) Field of Classification Search
CPC ............................ G06F 16/24542; G06F 16/22
See application file for complete search history.

(56) References Cited

U.S. PATENT DOCUMENTS

| 6,223,171 | B1 * | 4/2001 | Chaudhuri | .......... | G06F 11/3447 |
| | | | | | 707/718 |
| 7,949,654 | B2 | 5/2011 | Das et al. | | |
| 7,984,043 | B1 | 7/2011 | Waas | | |
| 9,229,983 | B2 | 1/2016 | Yu et al. | | |
| 9,495,419 | B1 | 11/2016 | Li et al. | | |
| 2006/0294058 | A1 * | 12/2006 | Zabback | ............. | G06F 16/2462 |
| 2007/0130107 | A1 | 6/2007 | Waas et al. | | |
| 2008/0120321 | A1 | 5/2008 | Liu et al. | | |
| 2009/0055368 | A1 | 2/2009 | Rewari et al. | | |
| 2010/0293156 | A1 | 11/2010 | Tanaka et al. | | |
| 2010/0306188 | A1 * | 12/2010 | Cunningham | .... | G06F 16/24542 |
| | | | | | 707/713 |
| 2011/0055201 | A1 | 3/2011 | Burger | | |
| 2011/0161310 | A1 | 6/2011 | Tang et al. | | |
| 2012/0173695 | A1 * | 7/2012 | Li | .......................... | H04L 41/042 |
| | | | | | 709/223 |
| 2014/0156632 | A1 | 6/2014 | Yu et al. | | |
| 2015/0310066 | A1 * | 10/2015 | Beavin | .............. | G06F 16/24542 |
| | | | | | 707/716 |
| 2016/0292224 | A1 | 10/2016 | Konik et al. | | |
| 2016/0306811 | A1 * | 10/2016 | Cao | ...................... | G06F 16/7867 |
| 2017/0337232 | A1 * | 11/2017 | Caspi | .................. | G06F 16/9032 |
| 2017/0366469 | A1 * | 12/2017 | Lagerholm | ............. | H04L 47/70 |
| 2018/0039674 | A1 * | 2/2018 | Seyvet | .............. | G06F 16/24568 |

* cited by examiner

*Primary Examiner* — Tamara T Kyle
*Assistant Examiner* — Lahcen Ennaji
(74) *Attorney, Agent, or Firm* — Davis Wright Tremaine LLP

(57) ABSTRACT

A database system may receive a query and form a plan for executing the query using a hypothetical index selected based on columns referenced by the query. The database system may compare the hypothetical index to indexes on the computing nodes of the database system. Based on the comparison, the database system may form a new index, based on the hypothetical index, on one of the computing nodes. An additional computing node may be added to the database system for the purpose of maintaining the new index. Subsequent queries having commonality with the first query may be processed on a node maintaining the first index.

20 Claims, 12 Drawing Sheets

INDEX-BASED REPLICA SCALE-OUT

BACKGROUND

Database systems may scale read-oriented workloads by the addition of computing nodes that maintain replicas of some or all of a collection of data. Typically, each computing node may maintain a copy of the data and a set of corresponding indexes. Read-oriented workload may be distributed among the computing nodes by a load balancing mechanism that distributes query execution tasks among the computing nodes. Accordingly, each of the computing nodes may process queries using by retrieving an appropriate set of data from its replica of the collection of data. The execution of certain queries on a computing node may be improved by using one or more of the set of indexes.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
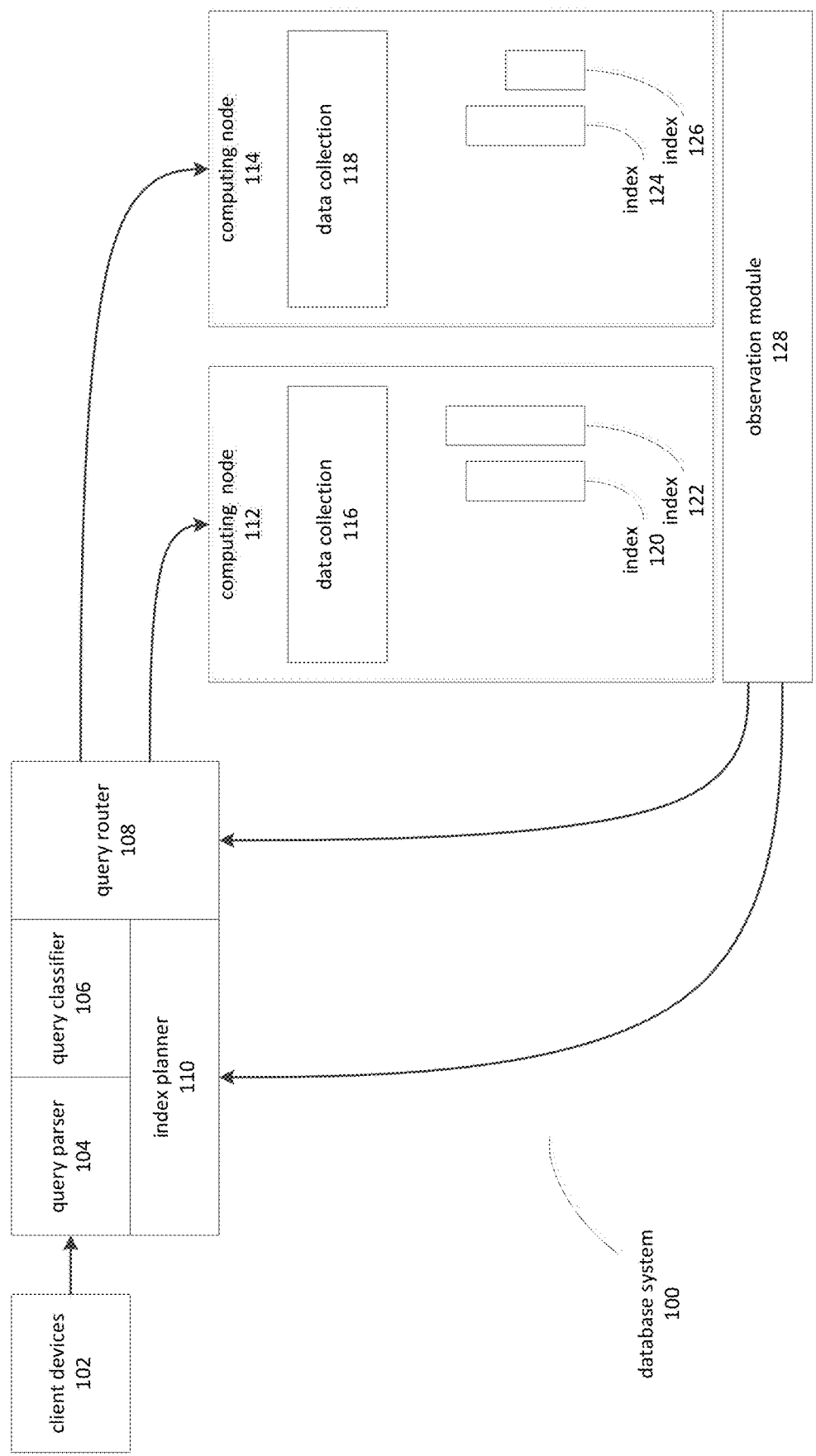
FIG. 1 is a block diagram depicting a database system.

Disclosed herein are systems, methods, and computer program products pertaining to the processing of queries in a database system. The database system may maintain copies of a collection data on each of a number of computing nodes. These nodes may sometimes be referred to as replicas. A query of the data may, accordingly, be processed on any one of the replicas. Typically, each replica may initially maintain a set of similar or identical indexes which may be used to facilitate processing of the query.

In an example embodiment, a database system may dynamically deploy indexes adapted to the needs of specific queries, or to specific classes of queries. The system may also, in some cases, dynamically deploy computing nodes adapted to the needs of the query, or class of queries, and the adapted index.

In an example, processing queries in a database system may comprise forming an index plan pertinent to the execution of a query. The index plan may represent a hypothetical index that, if it were to be maintained by one of the computing nodes in the database system, would be usable during the execution of the query. The index plan may, for example, describe the columns that are referenced by the query in its projection or filter clauses. The index plan may also refer to columns referenced in a function call, join, or other aspect of the query. More generally, the index plan may include information that describes the columns, function outputs, aggregated values, and so on where the presence of these values in an index may be useful to execute the query. The presence of these columns in the hypothetical index may improve the execution of the query, because their presence may reduce or eliminate the need to retrieve data from the underlying data store.

The processing of queries in the database system may further comprise determining to create the hypothetical index, or an index similar to it, on a computing node. The determination may be in response to examining the indexes presently maintained by the computing nodes of the database system, and determining that none of those indexes is similar to the hypothetical index. The performance to be gained by adding the hypothetical index, or modifying an existing index to form the hypothetical index, may be inverse to the hypothetical index's similarity to an existing index. An estimation function may be employed to calculate a performance gain that may result from employing the hypothetical index.

The processing of queries in the database system may further comprise selecting a computing node to maintain an index whose properties are based on the hypothetical index. The computing node may be selected based on a predicted cost of forming the index on the selected computing node, and on a predicted cost of executing the query on the selected computing node. These cost factors may be used to determine, for example, that the selected computing node is capable of forming and maintaining the index without undue disruption to its other functions. The cost factors may further indicate which node is able to provide the most benefit by maintaining the proposed index.

The processing of queries in the database system may further comprise identifying commonality between subsequent queries and the query upon which the formerly hypothetical index was based. Commonality may refer, for example, to the subsequent query being the same as the original, or similar with respect to its index utilization.

In another example, a query router may route queries based on data indicating how the query would be processed on a computing node. For example, the query router might receive a first plan describing how a query would be executed on a first computing node, and a second plan describing how a query would be executed on a second computing node. The query router may compare these plans to a third plan which is indicative of how the query might be processed using a hypothetical index modelled after the query. Based on this comparison, the query router may direct the query to the computing node whose plan for executing the query is closest to the idealized third plan.

The processing of queries using a hypothetical index may be better understood in view of FIG. 1, which is a block diagram depicting a database system. A database system 100 may comprise a number of computing nodes 112, 114. Each of the computing nodes 112, 114 may maintain a data collection 116, 118. The individual data collection 116, 118 may be subsets of the data maintained by the database system 100. For example, the database 100 may maintain a number of relational database tables. Each of the data collections 116, 118 may comprise a subset of these tables. In some cases, a table may be split across nodes, such that a first computing node 112 contains a first partition of a database table and a second computing node 114 contains a second partition.

Each of the computing nodes 112, 114 may maintain an index 120-126 corresponding to data stored within the data collections 116, 118. Typically, an index 120-126 may comprise references to data stored on the same computing node 112, 114 as the index. For example, a first computing node 112 may maintain indexes 120, 122 comprising references to the data collection 116 maintained by the first computing node 112. Similarly, a second computing node 114 may maintain indexes 124, 126 comprising references to the data collection 118 maintained by the second computing node 114.

An index 120-126 may comprise columns of data corresponding to columns of data maintained in the corresponding data collection 116, 118. For example, an index 120 may contain entries corresponding to rows of a table maintained in its corresponding data collection 116. Each entry in the index 120 may also comprise a reference to a corresponding row in the table. The index 120 may therefore be used to quickly locate rows of the table. Query performance may, consequently, benefit from the existence of the index 120, but there is also a cost, such as storage space and processor time, involved in forming and maintaining the index 120.

Various client devices 102 may send queries to be executed on one or more of the computing nodes 112, 114 that make up the database system 100. A query may refer to instructions for retrieving data from the database system 100. In some cases, a query may be expressed as text, e.g. as a structured query language ("SQL") query. Typically, the queries executed by a database system 100 may tend to be executed periodically. For example, a query directed to a list of bestselling items might be re-executed each hour, and a payroll query might be re-executed once every other week. The queries submitted by the client devices 102 may thus tend to follow various patterns which may be observed through the collection of statistics related to frequency and cost of execution.

An observation module 128 may collect data about queries that are executed on the computing nodes 112, 114 of the database system 100. The data may comprise information about the frequency with which certain queries are executed, the cost of executing the queries, and other pertinent data.

The database system 100 may further comprise components for analyzing queries submitted by various client devices 102. The components may comprise software modules loaded into the memory of a computing node and executed by a processor to perform an analysis function. The components may include a query parser 104, a query classifier 106, a query router 108, and an index planner 110.

The query parser 104 may perform textual or other forms of analysis on the query to determine what columns are referenced by a query. For example, the query parser 104 may identify a list of columns referenced in the filter clause of a query. In analyzing a SQL query, for example, the query parser 104 may identify the columns referenced in a WHERE clause. The query parser may also identify columns referenced in other portions of a query, such as in a projection clause. For example, the query parser 104 might identify a list of columns included in a SELECT clause of a query.

The query classifier 106 may examine queries to identify similarities between queries. For example, two distinct queries that reference the same columns in their respective filter clauses might be classified together, since the same index might be used in the processing of either query.

The query classifier 106 may also categorize a query with respect to various dimensions such as the frequency with which the query is executed and the cost of executing the query. The query classifier 106 might determine, for example, that one or more queries which utilize the same indexes might be costly to execute and frequently executed, costly to execute but not frequently executed, or cheap to execute but executed frequently.

The query router 108 may identify which of the computing nodes 112, 114 should be used to execute a query based on the indexes 120-126 available on the computing nodes 112, 114. For example, the query router 108 might determine that a first computing node 112 is best suited to execute a first query because of one of the indexes 120 contains all of the columns referenced in the query's filter clause and/or projection clause. In another case, the query router 108 might determine that a second computing node 114 is better suited to execute a second query, because the second query refers to columns contained in one of the indexes 124, 126 on the second computing node 114, but not in one of the indexes 120, 122 maintained by the first computing node 112.

The database system 100 may determine that operation of the system 100 may be improved by the addition of the index. The system 100 may, using information obtained by the query parser 104 and the query classifier 106, form a plan for executing the query using an ideal index. For example, the database system 100 might determine that a query might execute optimally if an index comprising columns $C_1$ and $C_2$, in ascending order, was available for use during execution of the query.

The query router 108 may determine, in some cases, that one of the computing nodes 112, 114 maintains an index 120-126 that is acceptably similar to the ideal index. For example, the query router 108 might determine that a computing node 114 comprises an index 124 that comprises columns $C_1$ and $C_2$, in descending rather than ascending order. The query router 108 might further determine that the difference between a predicted cost of executing a query using the ideal index and a predicted cost of executing the query using the existing index 124 is within an acceptable range.

In other cases, however, the query router 108 might determine that a performance improvement might be obtained by using the ideal index described by the query plan. The index planner 110 might then determine to create an index similar or identical to the ideal index on one of the computing nodes 112, 114. Alternatively, the index planner 110 might determine to place the new index on a computing node created specifically for the purpose of handling queries that would benefit from the existence of the ideal index.

The index planner 110 may evaluate information regarding the cost of creating and maintaining an index on any of the existing computing nodes 112, 114 or of a new computing node (now shown) that might be added to the database system.

Figure 2:
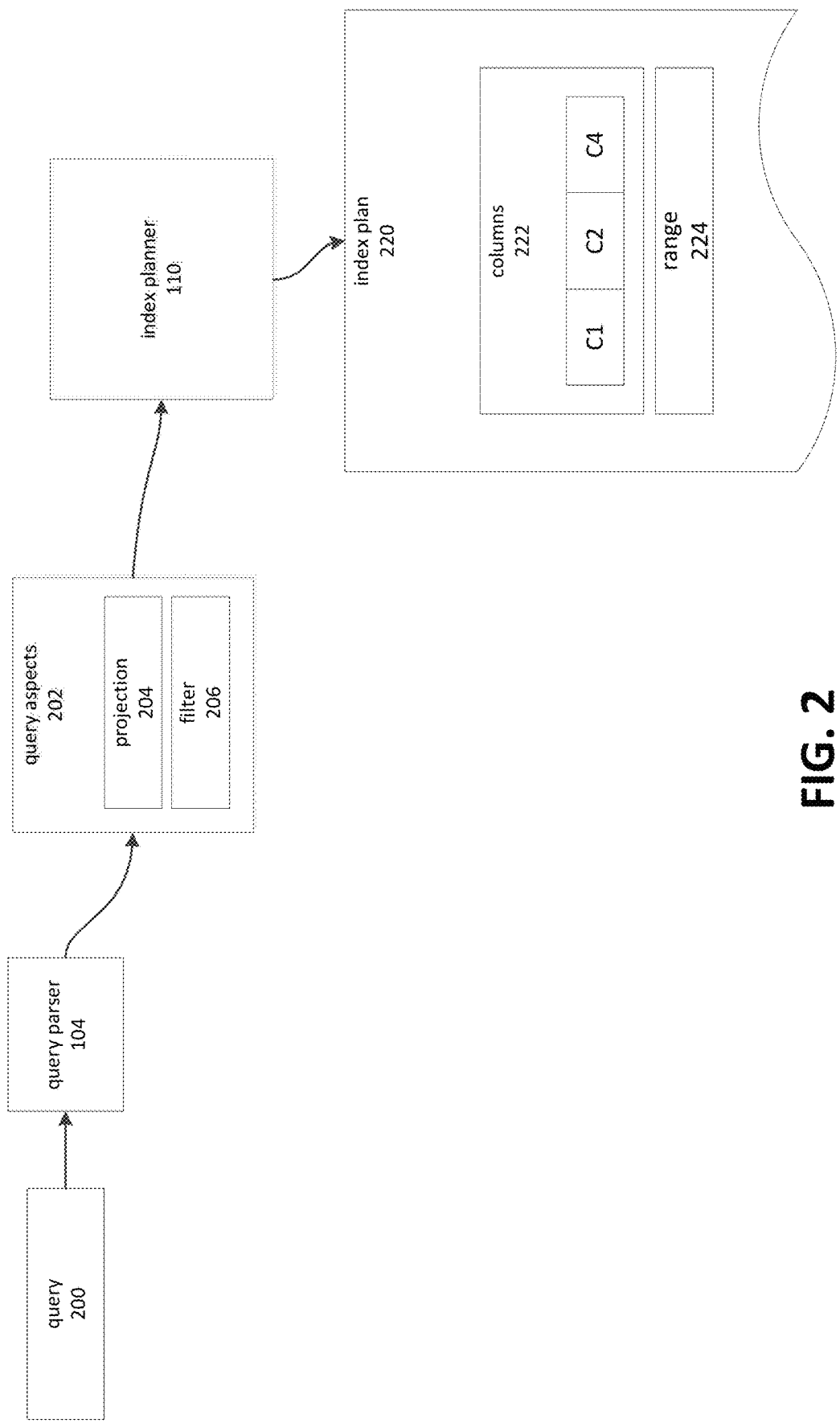
FIG. 2 is a block diagram depicting the operation of an index planner.

FIG. 2 is a block diagram depicting the operation of an index planner 110. The index planner 110 may receive information describing a query that has been submitted to the database system 100 for execution. The receiving may occur at any time, and may not necessarily be coincident with the submission of the query by a client device or with the execution of the query by the database system 100. For example, index planning operations may be performed in response to the provision of log information collected over a period of time. In another example, the index planning operations may be performed when the query is first received, under the expectation that similar queries will be received in the future and would benefit from the operations of the index planner 110.

The query parser 104 may parse the query 200 to identify various query aspects 202. The query aspects 202 may comprise projection 204 and filter 206 aspects. The projection 204 may pertain to data that is to be retrieved by execution of the query, and the filter 206 may refer to criteria used to limit the results of the data to a desired set. The query aspects 202 may comprise other considerations, such as whether or not the query contains joins and if so what values the join is on, the presence of nested queries, and the overall complexity of the query.

The index planner 110 may analyze aspects of the query to form an index plan pertaining to the execution of the query. The formation of the index plan may involve forming, in the memory of a computing device, representations of one or more indexes which, if they existed, would be useful for executing the query. These hypothetical indexes may be described as "ideal" indexes for executing the query. Note that this hypothetical index may not necessarily be ideal in a mathematically rigorous sense. The term ideal index refers to an index which, if it exists and is used to execute a query, would lead to improved performance over other ways of executing the query using other indexes that do not contain the identified properties, or using no indexes at all.

As depicted in FIG. 2, a formed index plan 220 may comprise representations of various properties of a hypothetically ideal index. The index plan 220 that FIG. 2 depicts comprises information identifying a set of columns 222 which would be included in the ideal index, and information identifying a range 224 of values for those columns 222. The range information 224 may be used, for example, when queries are performed on horizontally partitioned tables. For example, a WHERE clause of a SQL query might limit the results of a query to records falling within a certain range. The range information 224 might be indicative of this range, so that an index on an appropriate partition may be selected.

Figure 3A:
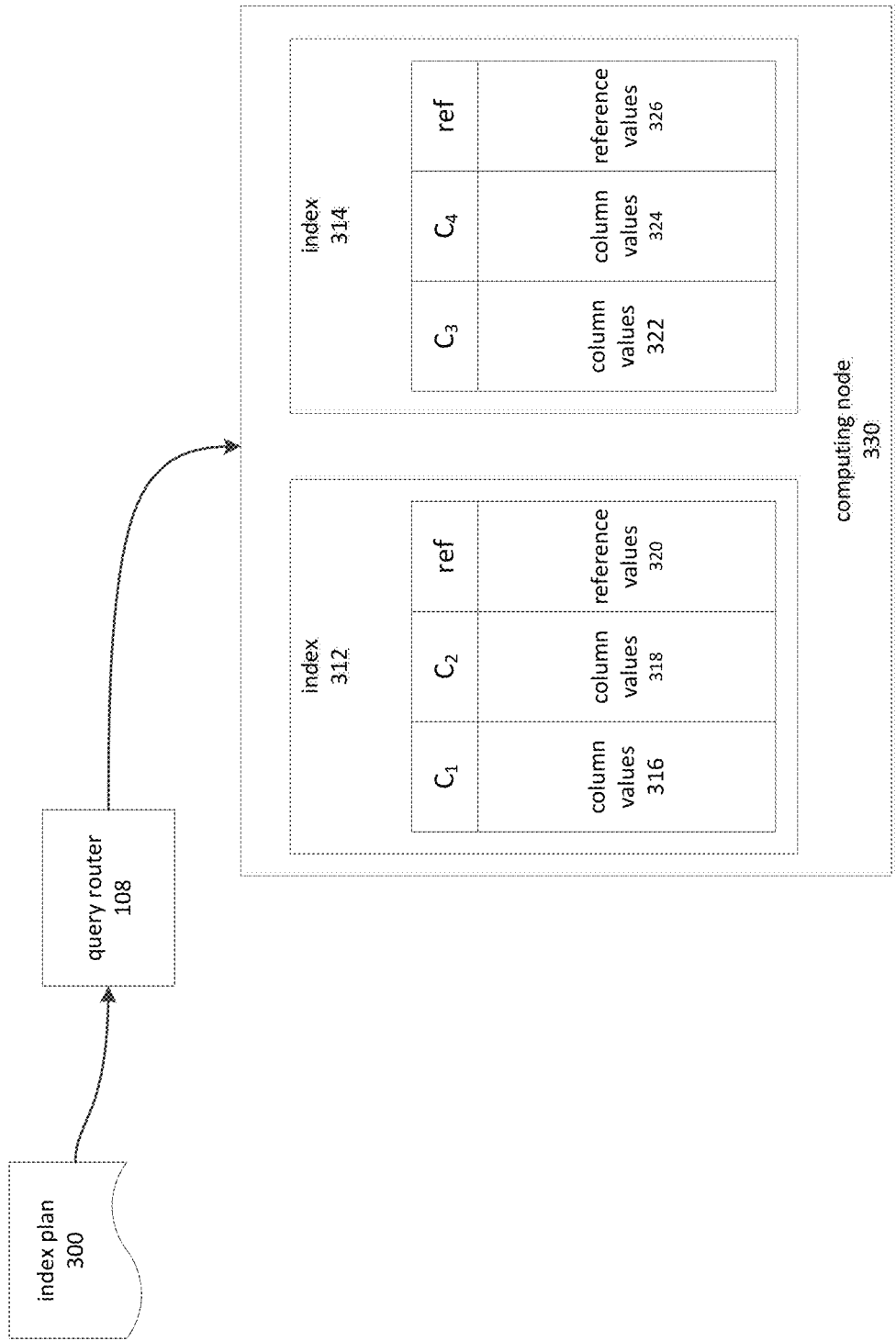
FIG. 3A is a block diagram depicting aspects of the operation of a query router.

The operation of the query router in relation to the index plan may be further understood in view of FIG. 3A, which is a block diagram depicting aspects of the operation of a query router. The query router 108 may receive an index plan 300 and use it to compare the properties of the ideal index defined by the index plan 300 to the indexes that are available on the computing nodes that make up the database system 100.

As an example, it might be assumed in FIG. 3A that a computing node 330 maintains two indexes 312, 314. The first index 312 might contain column values 316 for the columns $C_1$ and $C_2$, while the second index 314 might contain column values 322, 324 for the columns $C_3$ and $C_4$.

The index plan 300 might indicate that an ideal index would comprise columns $C_1$ and $C_3$. The query router 108 might examine the indexes available on the computing nodes of the database system 100 and determine that the closest set of available indexes exists on the computing node 330 that FIG. 3 depicts. However, as in the example of FIG. 3A, an ideal index may not yet be maintained on the computing node 330.

In some instances, the query router 108 may determine that the existing indexes 312, 314 are acceptable as substitutes, by determining that a predicted cost of executing the query using the two indexes 213, 213 (containing, respectively, columns $C_1$ and $C_2$ and $C_3$ and $C_4$.) might be similar to a predicted cost of executing the query using an ideal index comprising columns $C_1$ and $C_3$. If this is the case, query router 108 might cause queries similar to those on which the index plan was based to execute on the computing node 330.

In another example, a query might depend on columns $C_1$, $C_5$, and $C_6$. In this case, the two indexes 312, 314 on the computing node 330 do not, either alone or in combination, contain all of the columns that would be included in an ideal index. Nevertheless, in some cases the query router 108 may determine that the existing index 312, which contains data for column $C_1$, is sufficient. The determination may be based on a comparison of a predicted cost of executing the query with the index 312 and a predicted cost of executing a query using the ideal index.

However, it may be the case that query performance may be enhanced by the construction of an ideal index. Moreover, in some instances performance may be further enhanced by forming an additional computing node to maintain the ideal index and to process queries that may depend on the ideal index.

Figure 3B:
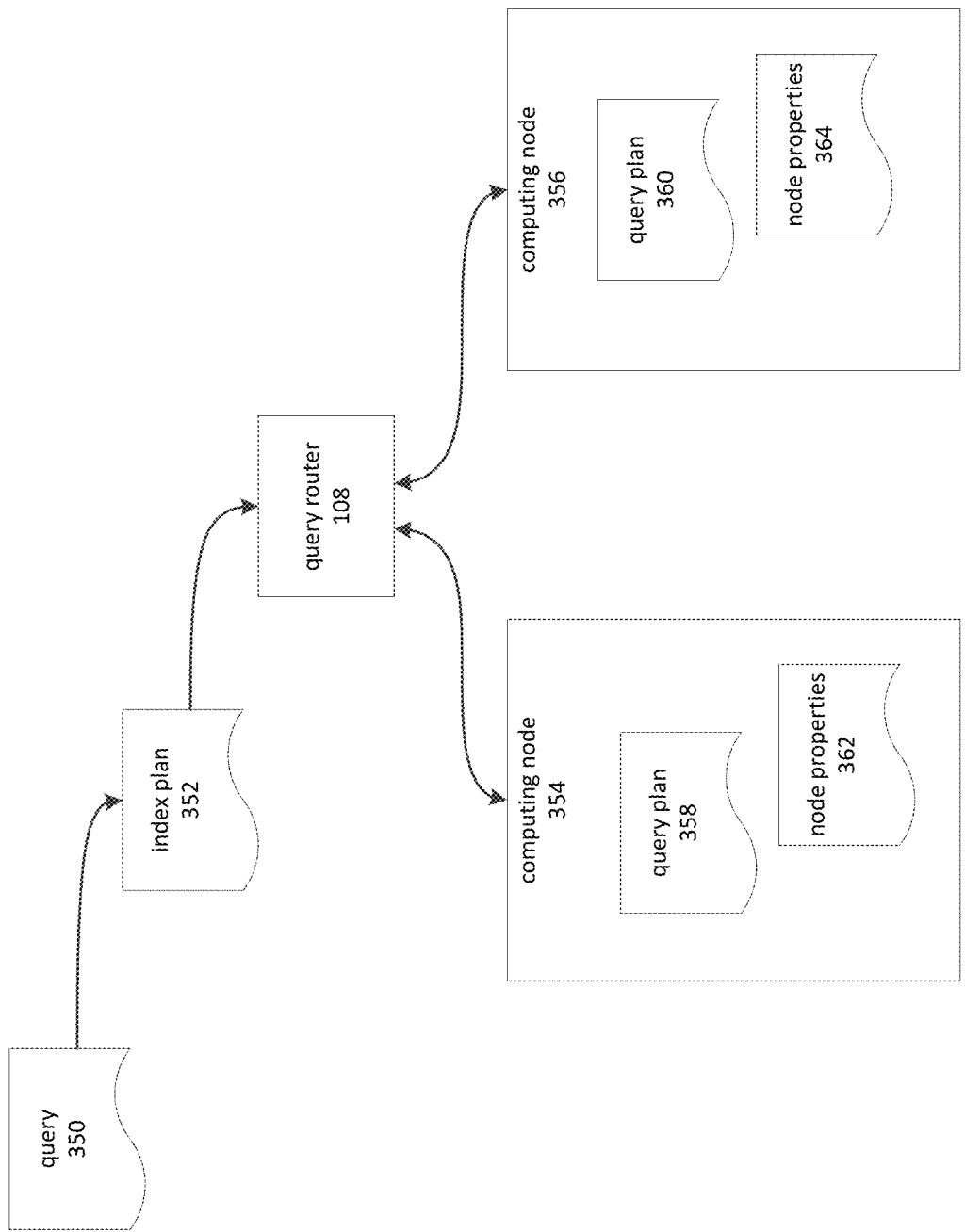
FIG. 3B is a block diagram depicted aspects of the operation of a query router.

FIG. 3B is a block diagram depicting additional aspects of the operation of a query router. The query router 108 may receive an index plan 352 corresponding to a query 350. As described herein, the index plan 352 may contain information describing the properties of a hypothetical index that is predicted to be beneficial for executing the query 350.

The query router 108 may further receive information, in some cases through an observation module 128 as depicted in FIG. 1, regarding the execution of the query 350 on the computing nodes 354, 356 of a database system. The information may comprise query plans 358, 360 and node properties 362, 364 for the computing nodes 354, 356.

A query plan 358, or some subset thereof, may be provided by a computing node 354 to the query router 108. A query plan, as used in the context of FIG. 3B, may refer to a plan for executing a query that typically originates from a query optimizer component of a database. For example, a query optimizer may identify a set of steps for executing a query on the computing node 354. The steps may, for example, comprise scanning an index, scanning a table, filtering result sets, and joining result sets. The information contained in the query plan may be adapted for forming an index plan or for comparing to an index plan. For example, the query router 108 may determine, from the query plan 358, what indexes are being used to perform the query 350 on the computing node 354, and what columns of those indexes are references. Similarly, the query plan 358 may be used to determine estimated costs of performing the query using the available indexes. In some instances, and index plan may be performed by adding or altering index usage in a query plan—for example by evaluating various "what if" scenarios involving the addition or modification of indexes. An estimate cost of executing a query using a hypothesized index may be calculated in this manner.

The computing node 354 may also provide various node properties 362. These may comprise various other pieces of information relevant to the usage of indexes on the computing node 354. For example, certain operations may be processor-centric while others are I/O-centric. The node properties 362 may therefore pertain to actual or estimated usage of processors, storage throughput, storage capacity, and so forth, related to execution of the query. The node properties 362 may also include information about the structure of the index, the structure of data storage, and so forth. For example, the node properties 362 might indicate whether the data is stored in column-oriented or row-oriented fashion, or describe the data structure on which the index was based.

The query router 108 may compare the index plan 352 with the query plans 358, 360 and node properties 362, 364 to determine which of the computing nodes 354, 356 is best suited to execute the query. The comparison may be based, for example, on comparing a hypothetical index proposed in the index plan 352 to the actual indexes used as described in the query plans 358, 360. Further refinement may be obtained by comparing the node properties 362 to those indicated as desirable in the index plan 352. The query router 108 may also consider other factors, such as the capacity for processing queries that is available on each of the computing nodes 354, 356. In some cases, the query router 108 may combine conventional load-balancing techniques with considerations based on comparison of the index plan 352 to the query plans 358, 360 and node properties 362, 364.

Figure 4:
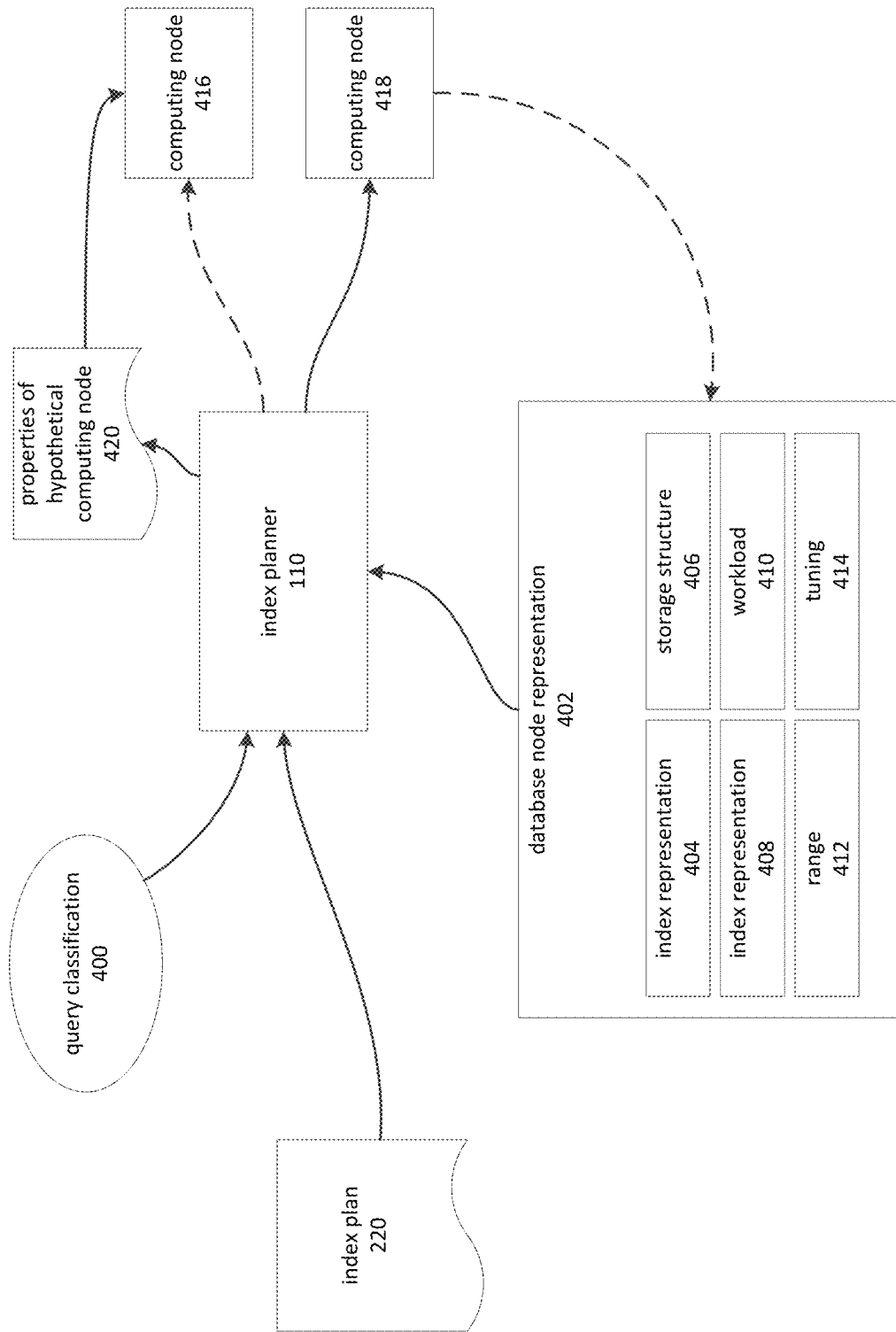
FIG. 4 is a block diagram depicting the operation of an index planner.

FIG. 4 is a block diagram depicting the operation of an index planner. In particular, FIG. 4 relates to the operation of an index planner 110 determining to create an index.

For a given query, the index planner 110 may receive data including the index plan 220 and a query classification 400. The index planner 110 may also receive one or more database node representations 402.

The query index plan 220 may comprise a description of one or more ideal indexes for executing a query, as described herein.

The query classification 400 may describe characteristics of the query, such as its commonality with other queries, its frequency of execution, and its cost of execution.

The database node representations 402 may be provided to the index planner 110. A database node representation 402 may correspond to a computing node 418. The database node representation 402 may comprise further information such as index representations 404, 408, storage structure 406, workload 410, range 412, and tuning 414.

The index representations 404, 408 may describe the indexes presently maintained by a computing node 418. This may include listings and descriptions of the columns included in the index, the order in which the data is stored, and so forth.

The storage structure 406 may pertain to the manner in which the computing node's portion of the collection of data is stored. For example, data may be stored in column-centric or row-centric fashion, clustered according to an index key, and so forth.

The workload representation 410 may provide data indicating how heavily the computing node 418 is being used. The workload representation 410 may, for example, provide an indication of capable the computing node 418 is of maintaining an additional index and handling additional queries.

The range information 412 may describe the ranges of data maintained in the computing node's 418 collection of data, and in the corresponding indexes.

The tuning information 414 may describe other factors relevant to the performance of the computing node 418. For example, the computing node 418 might be optimized for processor-centric workloads or for workloads that require intensive I/O operations.

The index planner 110 may utilize the database node representations 402 to identify which of a plurality of computing nodes is most suited for hosting an index compatible with the index plan 220. In some instances, the identification process may comprise operations including forming or receiving an index plan, using a received database node representation 402 to estimate a cost of creating the index proposed by the index plan on a computing node 418, and using the database node representation 402 to estimate a cost of executing the query on the computing node 418. The operations may further comprise making similar estimates on other computing nodes. A most appropriate node for the index may then be selected based on these estimates.

In other instances, the index planner 110 may determine that none of the existing computing nodes are suitable for maintaining the index. The index planner 110 might also determine that the query (or more commonly, queries similar to the query being analyzed) should be executed using the proposed index on a computing node 416 added to the database system 100 to maintain the proposed index and to process queries that depend upon the proposed index. The computing node 416 may be configured to have a set of properties, such as those related to storage capacity, storage architecture, storage structure, processor capacity, support for parallelism, and so forth corresponding to the properties of a hypothetical computing node 420. The properties of the hypothetical computing node 420 may be identified by the index planner 110 based on what properties a hypothetically ideal computing node would have, with respect to the query and the indexes used by the query.

Figure 5:
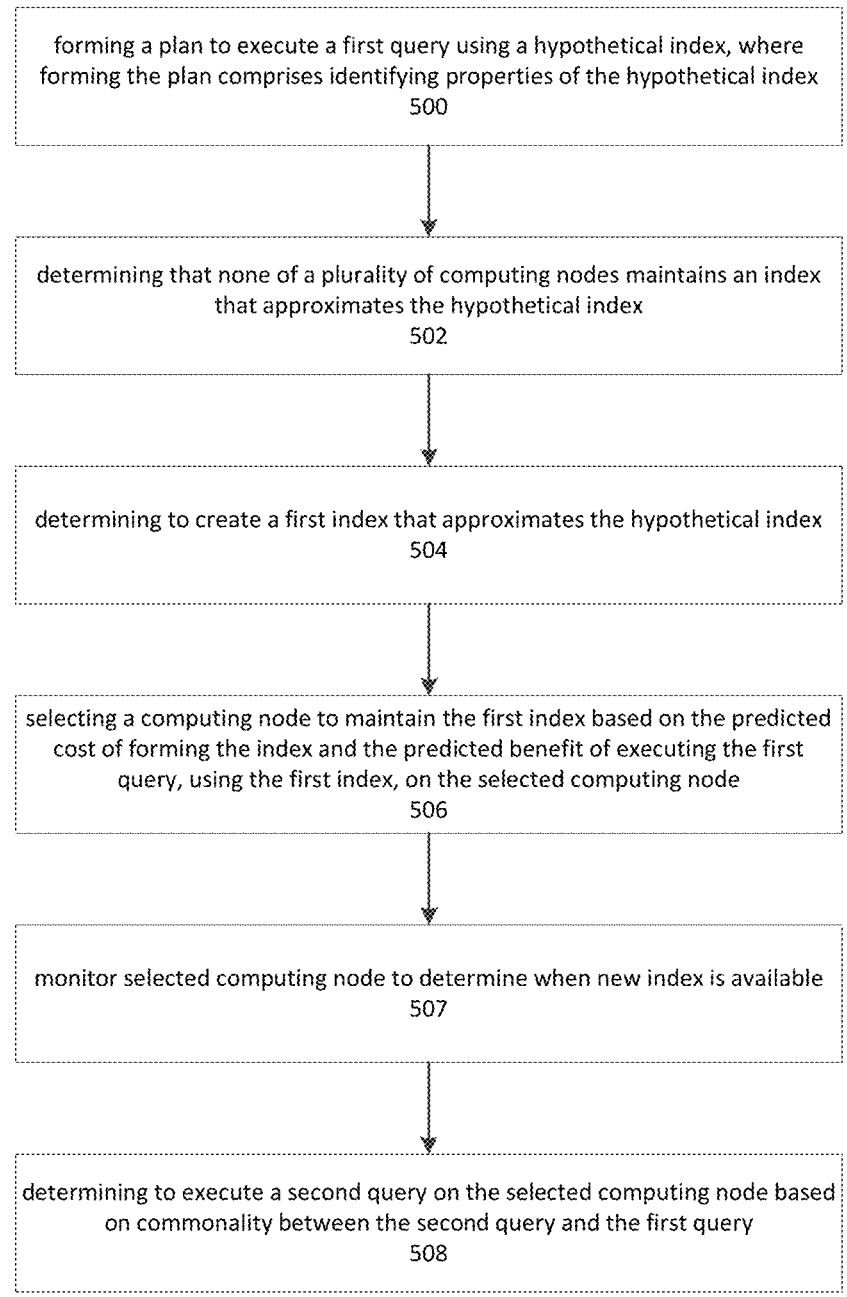
FIG. 5 is a flow diagram depicting an example operating process of a database system.

FIG. 5 is a flow diagram depicting an example operating process of a database system. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel.

Block 500 depicts forming a plan to execute a first query using a hypothetical index. Forming the plan refers to identifying the properties of a hypothetical index and storing representations of those properties in memory. For example, a structure comparable to the index plan 220 may be stored in the memory of a computing device. The properties of the hypothetical index may be identified, for example, by parsing the query and identifying columns referenced in the projection and/or filter clauses of the query. Forming the plan may also, in some instances, involve identifying properties of an ideal computing node. For example, the index planner 110 may identify properties of an ideal computing node for maintaining the index and/or for processing the query, such as one or more of processing capability, network capacity, interface speed, storage capacity, storage order for data stored by the node, and storage structure for the data. Various other characteristics, such as the operating system, software versions, type of hardware, and so forth, may also be considered and included in the plan. In some instances, factors such as the geographic or network location may also be considered. For example, computing nodes located nearer to the client might be preferred over computing nodes located more distantly. The plan may specify that the idea computing node would be at a geographic or network location closest to the client that issued the query. The formed plan may thus comprise representations of some combination of the aforementioned properties.

Block 502 depicts determining that none of the plurality of computing nodes that make up the database system maintains an index that approximates the hypothetical index. Disclosed herein are various methods of comparing indexes, and other factors, to determine how closely an index maintained by a computing node may approximate a hypothetically ideal index for processing a query. For example, the differences in columns represented by an existing index and a hypothetical index might be quantified, and this value used to determine whether the two are sufficiently similar. Certain columns, such as primary key columns or those referenced in filter clauses, might be weighted more heavily than other columns. A threshold value might be defined to quantize the value into "similar" and "not similar" categories.

Block 504 depicts determining to create a first index that approximates the hypothetical index. This may be based on the similarity measurements just discussed. When similarity is above the threshold level, such that the amount of predicted change to performance is minimal, the hypothetical index might not be created. On the other hand, if similarity is below a threshold level, or if there are no comparable indexes, the system might determine to create an index based on the hypothetical index represented by the index plan.

Block 506 depicts selecting a computing node to maintain the first index. The computing node may be selected based on a predicted cost of forming the first index on the computing node and the predicted benefit of executing the first query, using the first index, on the selected computing node. In some instances, the first index may be created on a number of computing nodes. This may be done, for example, when the query router 108 and/or observation module 128 indicates that a query is executed with high frequency and more than one computing node may be needed to adequately distribute demand.

Once the computing node has been selected, embodiments may cause the first index to be formed on the computing node. The formation process may comprise sending instructions, such as data definition language ("DDL") statements to the computing node and requesting that a database engine on the computing node execute the statements. The first index may be created as a new index structure, or as a modification of an existing index structure. Modifications to existing index structures may be more efficient, in some cases, than creating an entirely new index. The selection of the node, as depicted by block 506, may be based in part on the indexes already existing on the computing node. For example, if a computing node already maintains an index similar to the first index, it may be preferable over some other node that does not maintain a similar index. A computing node whose existing indexes are closest to the ideal index may therefore be prioritized for maintaining the new index over other nodes.

Block 507 depicts monitoring the selected computing node to determine when the first index is available for use in processing a query. Creating the index may take a significant amount of time, such that the first index may be created in anticipation of receiving similar queries, subsequent to creating the first index, at some future time. Moreover, because creating the index may be expensive in terms of processor capacity, storage capacity, network capacity, and so forth, the creation of the index may be delayed or performed as a background process. In various instances, a component such as the observation module 128 may monitor the computing nodes 112, 114 of a database system in order to determine when the index has been created and is available for use. Until this time, queries having commonality with the first query may be processed normally. After the index becomes available, such queries may, as depicted by block 508, be executed on the selected computing node in order to make use of the newly created or newly updated index.

Block 508 depicts determining to execute a second query on the selected computing node based on commonality between the second query and the first query. The execution of the second query based on commonality with the first query may be better understood in view of FIG. 6. A query router may, in some instances, perform operations related to determining where to execute the second query. In some instances, an association between a query and a computing node may be stored in a location accessible to a query router. The stored data may be structured so as to be searchable based on a query. The query router may then, upon receiving the second query for execution, determine that there is a first query similar to the second query, and that the first query has been associated with a particular computing node based on the indexes maintained on that node.

Figure 6:
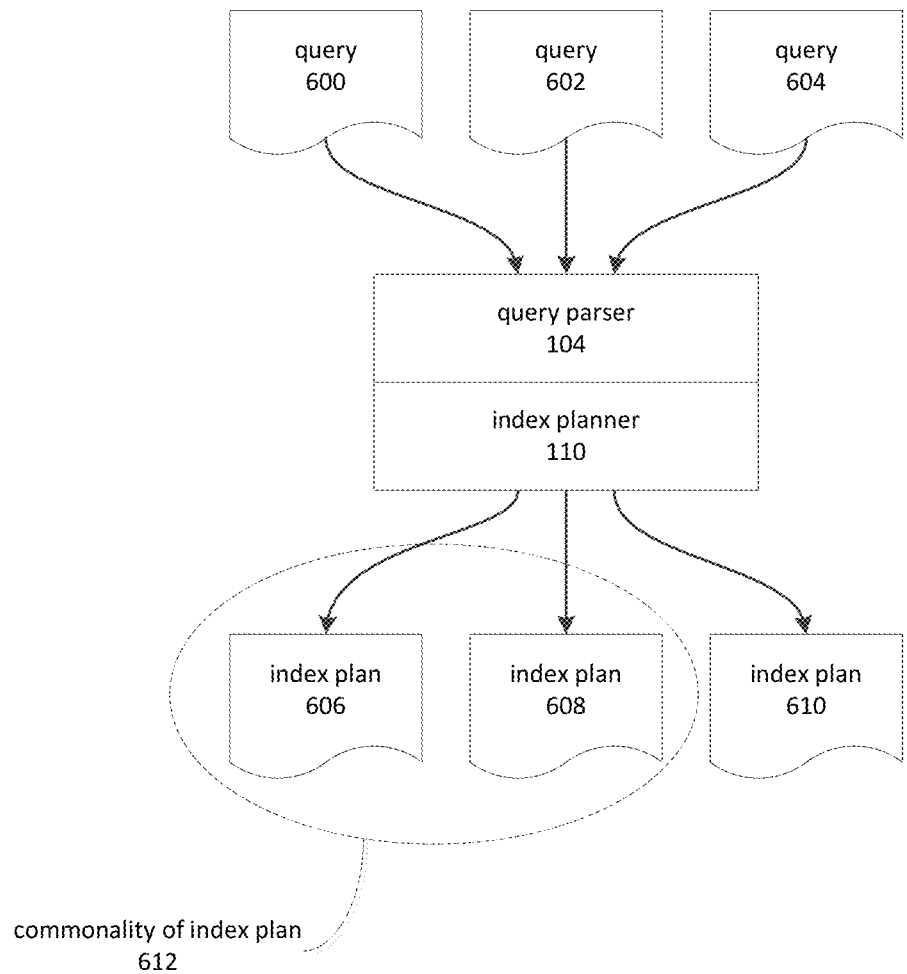
FIG. 6 is a block diagram depicting the operation of a query parser and index planner to identify commonality between queries.

FIG. 6 is a block diagram depicting the operation of a query parser and index planner to identify commonality between queries.

In the example of FIG. 6, a number of queries 600-604 may be received by the database system 100 and processed by the query parser 104 and index planner 110 to form index plans 606-610.

The index plans 606-610 may be evaluated, typically by the index planner 110 or query router 108, to identify commonality. For example, it might be determined that two index plans 606, 608 have commonality 612. The commonality may be based on the similarities of the hypothetical indexes proposed by each of the plans 606, 608. For example, each of the plans 606, 608 may define an index containing the same columns. In another example, one of the plans 606 might define a hypothetical index which contains a set of columns that is a subset of the columns contained by an index defined by the other plan 608. A third index plan 610 may not define any indexes with the set or subset of columns, and may therefore be considered to lack commonality with the other index plans 606, 608.

Note that various other approaches to commonality may be employed. In some instances, commonality may be measured based on literal or approximate equivalence of input queries. For example, two queries might be equivalent if they are represented by the same textual string. In other cases, commonality may be measured by literal or approximate equivalence between components of the query, such as filter clauses.

Figure 7:
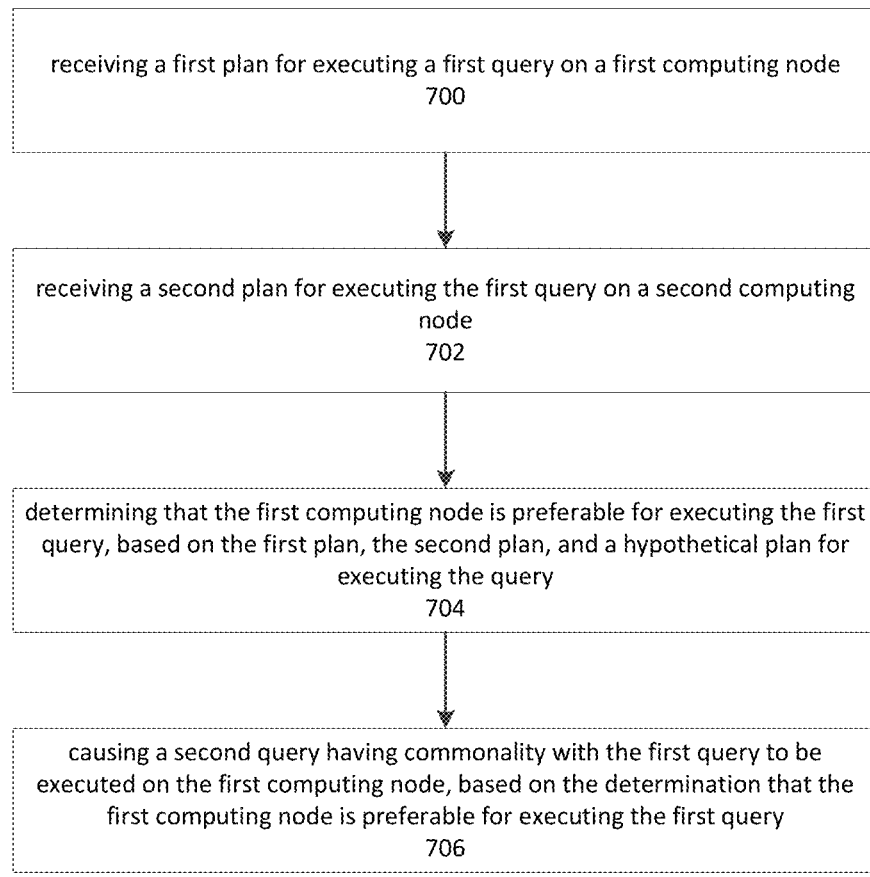
FIG. 7 is a flow diagram depicting a process for executing queries in a database system.

FIG. 7 is a flow diagram depicting a process for executing queries in a database system. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel.

Block 700 depicts receiving or otherwise obtaining a first plan for executing a first query on a first computing node, and block 702 depicts receiving a second plan for executing the first query on a second computing node. The receiving may refer to input, by the execution of a software module, of information describing the plans of execution. For example, the a query router module may receive information indicating how a query would be executed on a computing node. The plan for the first computing node may, for example, indicate which columns are available in indexes maintained by the first computing node, while the plan for the second computing node may indicate which columns are available in indexes maintained by the second computing node.

Block 704 depicts determining that the first computing node is preferable for executing the first query, based on a comparison involving the first plan, the second plan, and a hypothetical plan of execution. For example, the first computing node may be deemed preferable for executing the first query if the indexes it maintains are more similar to the hypothetical plan than those of the second computing node.

Block 706 depicts causing a second query having commonality with the first query to be executed on the first computing node, based on the determination that the first computing node is preferable. Causing the second query to be executed on the first computing node may involve, for example, sending instructions to execute the query to the first computing node. Instructions may be sent via any number of programming interfaces or protocols for database interaction.

Figure 8A:
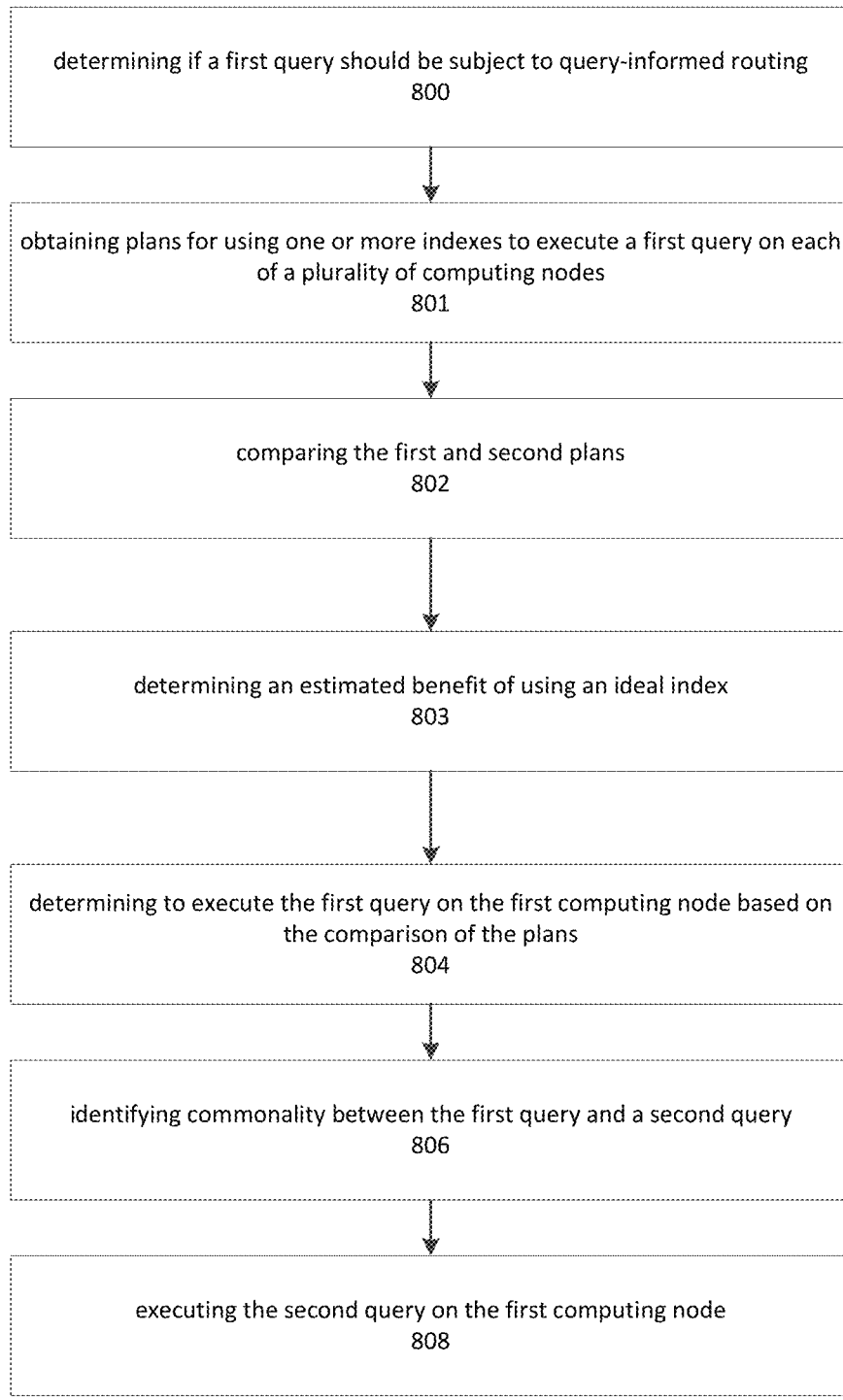
FIG. 8A is a block diagram depicting aspects of the operation of a database system.

FIG. 8A is a block diagram depicting aspects of the operation of a database system. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel.

Block 800 depicts determining if a first query should be subject to query-informed routing. The process of analyzing queries and performing query-informed routing may be somewhat expensive in terms such as processor utilization and input/output bandwidth. In various instances, query factors and classifications—such as the cost of executing a query and the frequency with which the query is executed—may be analyzed to determine which queries should be routed using the depicted technique. For example, the query router 108 may receive, from the query classifier 106, information indicating that a particular query is both costly and frequently executed, such that it is worth continuing to perform the analysis of the first query, as the analysis is described in FIG. 8A. In some cases, configuration information or administrative input may guide the decision of block 800. For example, information may be provided indicating that specific queries should be analyzed. The decision regarding analysis may also be weighted for or against analysis based on certain factors, such as whether the system typically executes ad hoc queries or a limited number of queries issued by a small number of clients.

Block 801 depicts obtaining plans for using one or more indexes to execute the first query on each of a first computing node and a second computing node. Obtaining plans for using one or more indexes may comprise, as described herein, parsing the first query and identifying columns referenced in projections and/or where clause. It may also comprise prioritization and selection of certain columns, based on their importance in the query. For example, analysis of the query may identify the relative importance, with respect to query performance, of certain columns. For example, a column used to join result sets might be prioritize for inclusion in the plan over a column referenced only in a projection.

Block 802 depicts comparing the first plan against the second plan. For example, the comparison may be made with respect to a baseline index or a hypothetically ideal index. This may, in some instances, comprise calculating a distance with respect to the baseline metric for each of the computing nodes. In another example, the multi-factored algorithm depicted by FIG. 8B may be employed.

Block 803 depicts determining an estimated benefit of using an ideal index. As noted, the first and second plans may be compared against a plan for using a baseline or hypothetically ideal index. In some cases, the difference between the three plans may be such that significant performance improvements may be obtained by using the ideal index. In such cases, the query router 108 may send information indicating that system performance may be improved by creating an index based on the ideal index.

Block 804 depicts determining to execute the first query on the first computing node, based on the comparison. As noted above regarding block 802, the output of the comparison may be a distance value or other metric indicative of the suitability of a given computing node for performing the query. The node with the best metric may be selected for performing the query. Alternatively, the metric may be combined in weighted fashion with other metrics, such as those indicative of the current load and/or capacity of the node to process queries, and compared to other combined metrics.

Block 806 depicts identifying commonality between the first query and a second query. Various techniques for identifying commonality have been described herein, such as those discussed in conjunction with FIG. 6.

Block 808 depicts causing the second query to be executed on the first computing node. This may be done in response to identifying the commonality between the first and second queries, and the determination that the first computing node is preferable for executing the first query. Causing the query to be executed, as described herein, may be done by sending instructions to execute the first computing node.

Figure 8B:
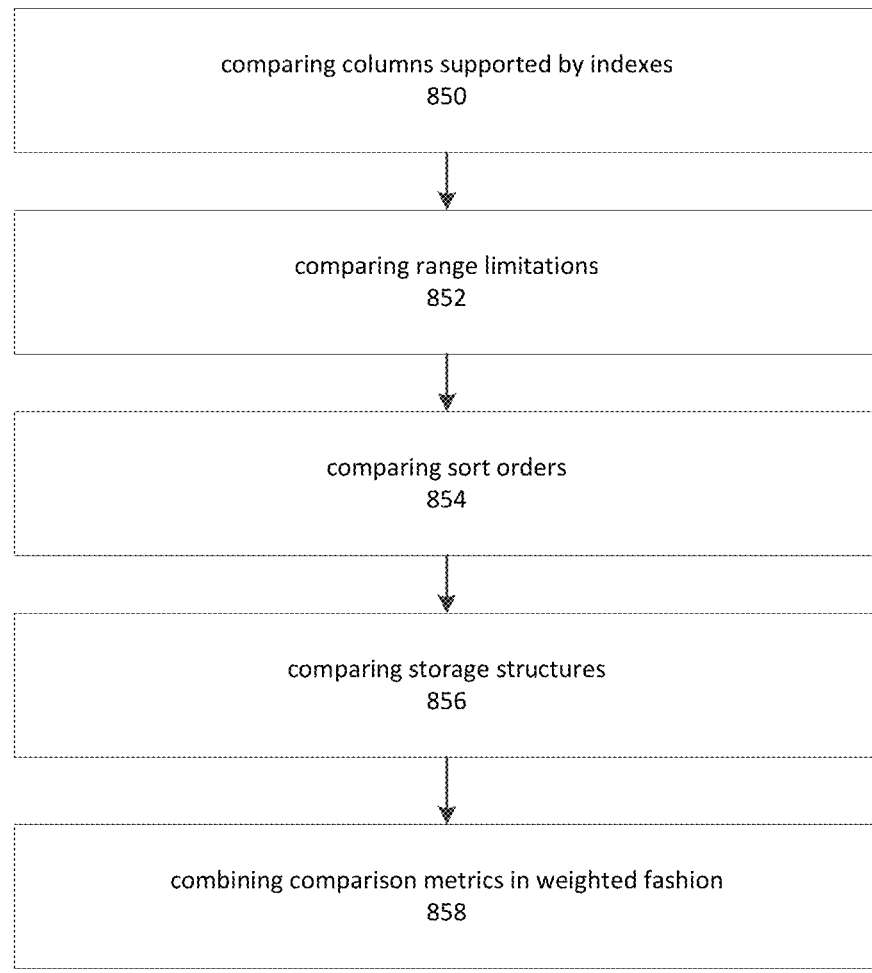
FIG. 8B is a block diagram depicting further aspects of the operation of a database system.

FIG. 8B is a block diagram depicting further aspects of the operation of a database system. In particular, FIG. 8B depicts an algorithm for comparing plans for executing a query to determine which of a number of computing nodes is preferable for performing a query. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel.

Block 850 depicts comparing the columns supported by the indexes of the respective nodes. The comparison may be done in view of the columns referenced by the first query, e.g. as expressed in a representation of a hypothetically ideal index. The computing node whose indexes support the greater number of columns may be predicted to better support execution of the query.

Block 852 depicts comparing range limitations of the respective indexes, and their corresponding collections of data. This may be of particular importance when data is partitioned, as a partition that does not contain the appropriate range of data may be inefficient or incapable of processing the query.

Block 854 depicts comparing sort orders of the indexes and/or the corresponding collections of data. Sort order may be relevant to the performance of the query, particularly where the output of the query is to be sorted. Accordingly, computing nodes whose indexes are sorted in the appropriate order may be more suited for executing the query.

Block 856 depicts comparing storage structures. The pertinent storage structures may include those used by the index and by the corresponding collection of data. For example, some indexes may be specifically adapted for certain query types. Examples include clustered, non-clustered, sparse, associative, and spatial indexes. The corresponding collection of data may be similarly adapted to various applications. Accordingly, computing nodes whose indexes are most similar to those of the hypothetically ideal index may be predicted to be better for executing the query. Differences between the structure of the collection of data and a hypothetically ideal storage structure may similarly influence the predicted suitability of the computing node for executing the query.

Block 858 depicts that the various comparisons may be combined, in weighted fashion, to obtain an overall metric indicative of a computing node's suitability for executing a query. This score may be compared to those obtained for other computing nodes, and the computing node with the best score selected.

Figure 9:
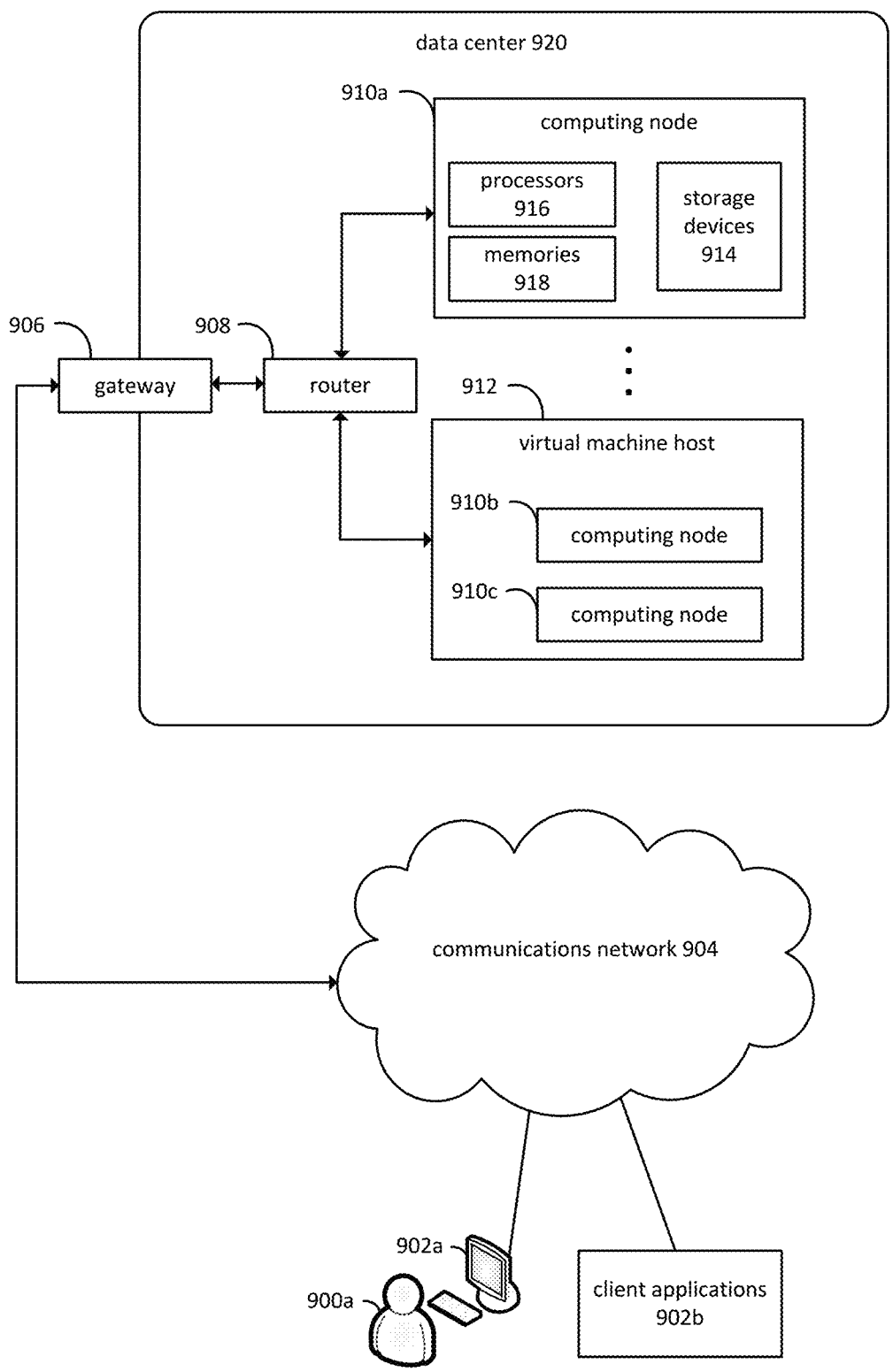
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900*a* may interact with various client applications, operating on any type of computing device 902*a*, to communicate over communications network 904 with processes executing on various computing nodes 910*a*, 910*b*, and 910*c* within a data center 920. Alternatively, client applications 902*b* may communicate without user intervention. Communications network 904 may comprise any combination of communications technology, including the Internet, wired and wireless local area networks, fiber optic networks, satellite communications, and so forth. Any number of networking protocols may be employed.

Communication with processes executing on the computing nodes 910*a*, 910*b*, and 910*c*, operating within data center 920, may be provided via gateway 906 and router 908. Numerous other network configurations may also be employed. Although not explicitly depicted in FIG. 9, various authentication mechanisms, web service layers, business objects, or other intermediate layers may be provided to mediate communication with the processes executing on computing nodes 910*a*, 910*b*, and 910*c*. Some of these intermediate layers may themselves comprise processes executing on one or more of the computing nodes. Computing nodes 910*a*, 910*b*, and 910*c*, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910*a* is depicted as residing on physical hardware comprising one or more processors 916, one or more memories 918, and one or more storage devices 914. Processes on computing node 910*a* may execute in conjunction with an operating system or alternatively may execute as a bare-metal process that directly interacts with physical resources, such as processors 916, memories 918, or storage devices 914.

Computing nodes 910*b* and 910*c* are depicted as operating on virtual machine host 912, which may provide shared access to various physical resources, such as physical processors, memory, and storage devices. Any number of virtualization mechanisms might be employed to host the computing nodes.

The various computing nodes depicted in FIG. 9 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 10:
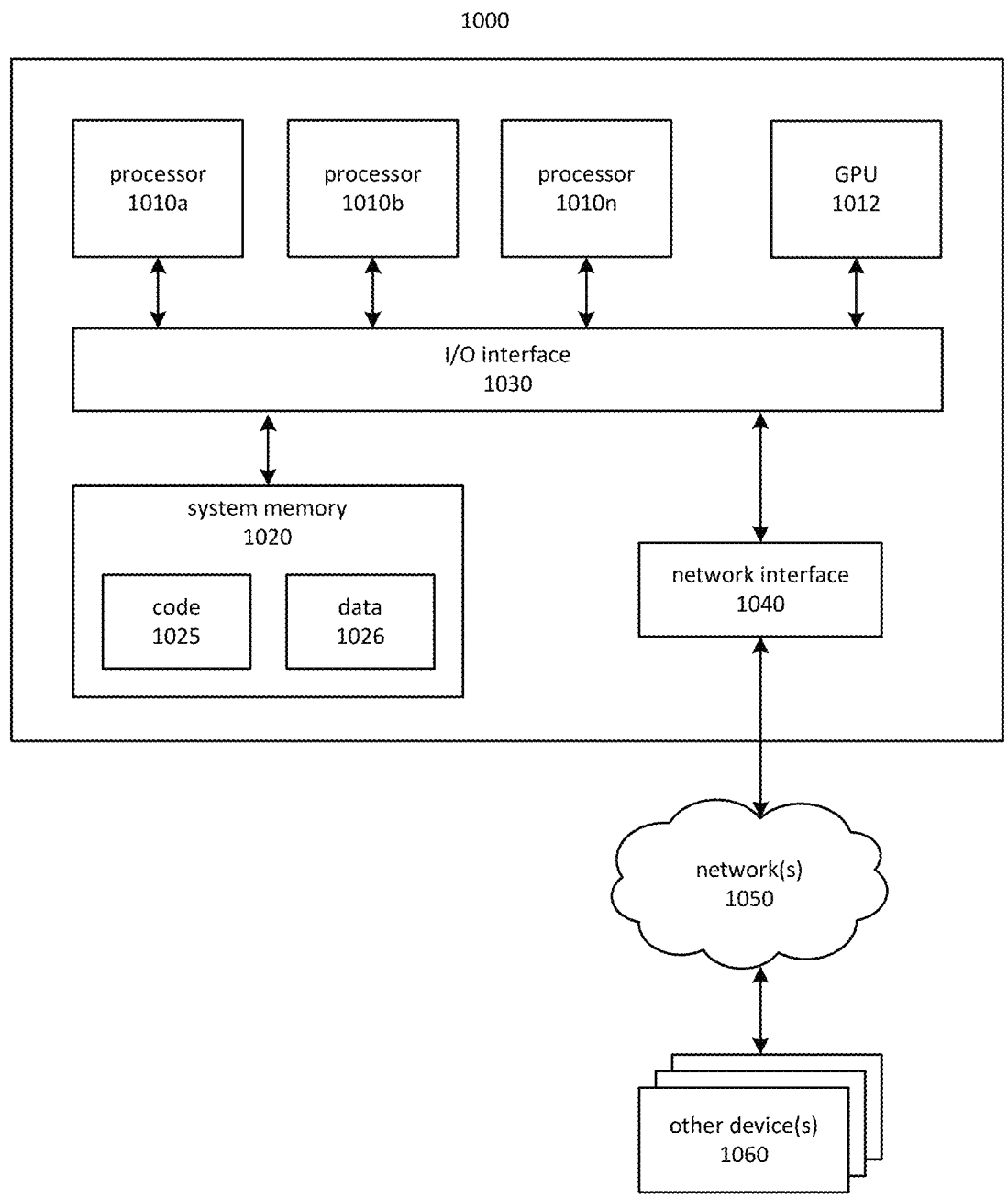
FIG. 10 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. In the illustrated embodiment, computing device 1000 includes one or more processors 1010*a*, 1010*b*, and/or 1010*n* (which may be referred herein singularly as a processor 1010 or in the plural as the processors 1010) coupled to a system memory 1020 via an input/output ("I/O") interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1010 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 1010 and GPU 1012 may be implemented as one or more of the same type of device.

System memory 1020 may be configured to store instructions and data accessible by processor(s) 1010. In various embodiments, system memory 1020 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1020 as code 1025 and data 1026.

In one embodiment, I/O interface 1030 may be configured to coordinate I/O traffic between processor 1010, system memory 1020, and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect ("PCI") bus standard or the Universal Serial Bus ("USB") standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
a plurality of computing nodes each maintaining a replica of a portion of a collection of data;
a computing device comprising one or more processors and one or more memories, the one or more memories having stored thereon instructions that, upon execution by the one or more processors, causes the system to at least:
receive information indicative of a first query of the collection of data;
form a first plan for executing the first query on at least one of the plurality of computing nodes, the first plan comprising information indicative of a hypothetical index comprising a first one or more columns, wherein the hypothetical index, if created, would be usable to execute the first query;
determine to create a first index, based at least in part on the hypothetical index, on at least one of the plurality of computing nodes in response to determining that none of the plurality of computing nodes maintains a second index comprising at least a subset of the first one or more columns of the hypothetical index;
determine to create the first index on a first computing node, of the plurality of computing nodes, based at least in part on a first predicted cost of forming and maintaining the first index on the first computing node and on a second predicted cost of executing the first query, the second predicted cost determined at least based on a predicted cost of executing the first query using at least one existing index comprised in one of the plurality of computing nodes;
send instructions for creating the first index on the first computing node; and
cause a second query to be executed on the first computing node in response to the second query having commonality with the first query, the commonality determined at least based on comparing a component of the first query to a component of the second query.

2. The system of claim 1, wherein forming the first plan comprises parsing the first query to identify references to the first one or more columns in at least one of a projection or filter of the first query.

3. The system of claim 1, wherein the one or memories have stored thereon further instructions that, upon execution by the one or more processors, cause the system to at least:
send a request to add an additional computing node to the plurality of computing nodes, the request comprising information indicative of the first index, wherein the additional computing node is configured, in response to the request, to maintain the first index; and
cause a third query to be executed on the additional computing node in response to identifying commonality between the first query and the third query.

4. The system of claim 3, wherein a storage structure of the first index and a processor capacity of the additional computing node is based at least in part on the first plan.

5. The system of claim 1, wherein causing the second query to be executed on the first computing node comprises storing information indicative of a mapping between the first query and the first computing node.

6. A method comprising:
forming a first plan to execute a first query, wherein the first plan comprises information indicative of using a first index comprising one or more columns, wherein the first index, if maintained by one of a plurality of computing nodes, would be usable in the execution of the first query;
determining to create the first index in response to determining that none of the plurality of computing nodes maintains a second index that is at least a subset of the first index;
creating the first index on a first computing node, of the plurality of computing nodes, wherein the first computing node is to maintain the first index based at least in part on a first predicted cost of forming the first index on the first computing node and on a second predicted cost of executing the first query using another index associated with one of the plurality of computing nodes; and
executing a second query on the first computing node in response to identifying commonality between the first query and the second query, the commonality determined at least based on query components associated with the first and second queries.

7. The method of claim 6, wherein forming the first plan comprises identifying references to the one or more columns in at least one of a projection, function, join, or filter of the first query.

8. The method of claim 7, wherein forming the first plan comprises identifying a range of values for the one or more columns based at least in part on the filter.

9. The method of claim 6, wherein forming the first plan comprises identifying properties of an ideal index, the properties comprising at least one of columns, ranges of data, index order, and index structure.

10. The method of claim 6, further comprising:
determining to add an additional computing node to the plurality of computing nodes, the determining based at least in part on capacity of the plurality of computing nodes to execute queries using the second index.

11. The method of claim 10, wherein a storage structure of the first index and a processor capacity of the additional computing node is based at least in part on the first plan.

12. The method of claim 6, wherein forming the first plan comprises identifying properties of an ideal computing node for executing the first query, the properties comprising at least one of processing capability, network capacity, interface speed, storage capacity, storage order, and storage structure.

13. The method of claim 6, further comprising:
determining to create the first index based at least in part on at least one of a frequency or cost of executing queries having commonality with the first query.

14. The method of claim 6, further comprising:
identifying commonality between the first query and the second query based at least in part on a comparison of the first plan with a second plan corresponding to the second query.

15. A non-transitory computer-readable storage medium, having stored thereon instructions that, upon execution by one or more computing devices, cause the one or more computing devices at least to:
identify one or more columns of a first index that, if maintained by one of a plurality of computing nodes of a database, would be usable to execute a first query;

determine to create the first index in response to determining that none of a plurality of computing nodes of the database maintains a second index that is at least a subset of the first index;

create the first index on a first computing node, of the plurality of computing nodes, wherein the first computing node is to maintain the first index based at least in part on a first predicted cost of forming the first index on the first computing node and on a second predicted cost of executing the first query on the first computing node, the second predicted cost based at least on a predicted cost of executing the first query using another index possessing a column or row structure at least partially different than a column or row structure of the first index; and send instructions to execute a second query on the first computing node, the instructions sent in response to identifying commonality between the first query and the second query, the commonality determined at least based on comparing query components associated with the first and second queries.

16. The non-transitory computer-readable storage medium of claim 15, further comprising instructions that, upon execution by the one or more computing devices, cause the one or more computing devices at least to:

determine to add an additional computing node to the plurality of computing nodes, the determining based at least in part on a predicted capacity of one or more computing nodes, of the plurality of computing nodes, to execute queries using the first index.

17. The non-transitory computer-readable storage medium of claim 15, further comprising instructions that, upon execution by the one or more computing devices, cause the one or more computing devices at least to:

determine to add an additional computing node to the plurality of computing nodes, the determining based at least in part on a predicted capacity of one or more computing nodes, of the plurality of computing nodes, to form and maintain the first index.

18. The non-transitory computer-readable storage medium of claim 15, further comprising instructions that, upon execution by the one or more computing devices, cause the one or more computing devices at least to:

identify properties of a hypothetical computing node for executing the first query, the properties comprising at least one of processing capability, storage capacity, storage order, and storage structure; and cause an additional computing node to be configured based on the identified properties of the hypothetical computing node.

19. The non-transitory computer-readable storage medium of claim 15, further comprising instructions that, upon execution by the one or more computing devices, cause the one or more computing devices at least to:

determine to create the first index on at least one of the plurality of computing nodes, based at least in part on at least one of a frequency or cost of executing queries having commonality with the first query.

20. The non-transitory computer-readable storage medium of claim 15, further comprising instructions that, upon execution by the one or more computing devices, cause the one or more computing devices at least to:

identify the commonality between the first query and the second query by comparing the one or more columns of the first index to one or more columns referenced by the second query.

* * * * *